United States Patent [19]

Nugent, Jr. et al.

[11] Patent Number: 5,008,137
[45] Date of Patent: Apr. 16, 1991

[54] BARRIER COATINGS

[75] Inventors: Richard M. Nugent, Jr.; Ken W. Niederst, both of Allison Park; Jerome A. Seiner, Pittsburgh, all of Pa.

[73] Assignee: PPG Industries, Inc., Pittsburgh, Pa.

[21] Appl. No.: 367,992

[22] Filed: Jun. 19, 1989

Related U.S. Application Data

[63] Continuation of Ser. No. 152,176, Feb. 4, 1988, abandoned.

[51] Int. Cl.$^5$ .................... B65D 25/00; B32B 27/08
[52] U.S. Cl. .................... 428/35.4; 428/36.6; 428/412; 428/413; 428/483; 428/516; 428/523; 525/525; 525/526
[58] Field of Search .................... 428/35.4, 36.6, 367, 428/412, 523, 516, 483, 413, 480; 215/1 C; 525/525, 526

[56] References Cited

U.S. PATENT DOCUMENTS

| | | | |
|---|---|---|---|
| 2,830,721 | 4/1958 | Pinsky et al. | 215/1 C |
| 2,909,448 | 10/1959 | Schroeder | 117/141 |
| 3,337,609 | 8/1967 | Williamson et al. | 260/482 |
| 3,399,162 | 8/1968 | Salame | 260/33.2 |
| 4,528,219 | 7/1985 | Yamada et al. | 428/480 |

OTHER PUBLICATIONS

Salame, "Permeability of Plastics: Inherent Limitation or Not?", Problem Solving Plast., Compilation Pap. Symp. 1971, Pub.: Nat. Assn. Corros. Eng., 82–86.

Primary Examiner—James Seidleck
Attorney, Agent, or Firm—Godfried R. Akorli

[57] ABSTRACT

Multilayer packaging materials and multilayer containers including a barrier material having excellent resistance to gas permeability are provided. The multilayer packaging materials and containers include at least one permeable polymeric material and at least one layer of a barrier material which is a reaction product of: (i) an ungelled amine-functional polymeric resin, which is a reaction product of a polyamine and a polyfunctional material having at least two functional groups reactive with said polyamine, the ungelled polymeric resin further containing an average of greater than two polyamine moieties per molecule within said resin; and (ii) a material selected from the group consisting of a polyepoxide, a polyoxalate or mixtures thereof, the barrier material characterized as containing at least about four percent by weight amine nitrogen and having an oxygen permeability of less than about 3 cc-mil/100 in$^2$-day-atmosphere and a carbon dioxide permeability of less than about 15 cc-mil/100 in$^2$-day-atmosphere at 23° C. and zero percent relative humidity. The barrier material can be formed from coating compositions including as co-curable resinous materials, e.g., a polyepoxide and an ungelled amine-functional polymeric resin formed from a polyepoxide and a polyamine having up to about two primary amino nitrogen groups per molecule, the polyamine and polyepoxide present in a reaction mixture at a molar ratio of from about 1.4:1 to about 0.83:1.

26 Claims, No Drawings

BARRIER COATINGS

This is a continuation of application of Ser. No. 152,176, filed Feb. 4, 1988, now abandoned.

The present invention relates to thermoset barrier materials, curable coating compositions for forming such materials, and to packaging materials and/or containers including thermoset barrier materials.

BACKGROUND OF THE INVENTION

Plastics have found ever increasing use as replacements for glass and metal containers in packaging, especially of foods and beverages. The advantages of such plastic packaging includes lighter weight, decreased breakage (versus glass) and potentially lower costs. However, the gas-barrier properties of common packaging plastics, such as polyolefins, e.g., polyethylene and polypropylene, and polycarbonates, present major disadvantages in the packaging of many foods and beverages. For example, many foods and beverages are sensitive to oxidation and must be protected from oxygen to prevent discoloration or other detrimental effects. Further, plastic beverage containers suffer comparative shelf-life problems versus glass or metal due to the loss of carbon dioxide through the plastic container.

Numerous barrier coatings have been developed including, e.g., barrier materials based on vinylidene chloride or on ethylene-vinyl alcohol. Each of these materials have drawbacks. Ethylene-vinyl alcohol-based polymers lose barrier properties upon exposure to water and packages of this material cannot generally undergo retort, i.e., heating under pressurized steam for pasteurization. Vinylidene chloride-based polymers have been recognized as having excellent gas-barrier properties, but preparation of such vinylidene chloride-based polymers must generally be done under high pressure. Further, since vinylidene chloride-based barrier materials include halogen atoms, the disposal of such materials via incineration poses environmental problems. In addition, both vinylidene chloride-based polymers and ethylene-vinyl alcohol based polymers exhibit loss of adhesion after undergoing retort.

SUMMARY OF THE INVENTION

The present invention concerns moisture insensitive, thermoset barrier materials having low oxygen and carbon dioxide permeabilities. Such thermoset barrier materials are characterized as containing at least about four percent by weight amine nitrogen basis total weight of barrier material and as having an oxygen permeability of less than about 3 ccmil/100 in$^2$-day-atmosphere and a carbon dioxide permeability of less than about 15 cc-mil/100 in$^2$-day-atmosphere at 23° C. and zero percent relative humidity. The novel thermoset barrier materials of this invention may be a reaction product of: (i) an ungelled amine-functional polymeric resin which is a reaction product of a polyamine having up to about two primary amino nitrogen groups per molecule and a polyepoxide, the polyamine and polyepoxide present in the reaction mixture at a ratio of from about 1.4:1 to about 0.83:1 based upon moles of polyamine to moles of polyepoxide; and, (ii) a material selected from the group consisting of a polyepoxide, a polyoxalate, or mixtures thereof. In one embodiment, the ratio of ungelled amine-functional polymeric resin to polyepoxide is from about 0.1:1 to about 1:1, preferably from about 0.2:1 to about 0.8:1 based upon epoxy groups to amine hydrogens.

Still further, in accordance with the present invention, novel thermosetting coating compositions are provided and include as co-curable resinous components, first, a material selected from a polyepoxide, a polyoxalate or mixtures thereof and, second, an ungelled amine-functional polymeric resin, more usually, a solution of an ungelled amine-functional polymeric resin, said resin comprising a reaction product of a polyamine having up to about two primary amino nitrogen groups per molecule and a polyepoxide, the polyamine and polyepoxide present in the reaction mixture of a ratio of from about 1.4:1 to about 0.83:1 based upon moles of polyamine to moles of polyepoxide and said resin further containing sufficient amine nitrogen on a percent by weight basis so as to provide a cured thermoset product with an amine nitrogen content of at least four percent by weight, basis total weight of resinous components.

In further accordance with the present invention, a packaging material is provided which includes at least one layer of a gas-permeable polymeric material and at least one layer of a thermoset barrier material characterized as containing at least about four percent by weight amine nitrogen, basis total weight of the barrier material, and as having an oxygen permeability of less than about 3 cc-mil/100 in$^2$-day-atmosphere and a carbon dioxide permeability of less than about 15 cc-mil/100 in$^2$day-atmosphere at 23° C. and zero percent relative humidity. The barrier material included in the packaging material may be a reaction product of: (i) an ungelled amine-functional polymeric resin which is a reaction product of a polyamine and a polyfunctional material having at least two functional groups reactive with said polyamine, the ungelled polymeric resin further containing an average of greater than two polyamine moieties per molecule within said resin; and (ii) a material selected from the group consisting of a polyepoxide, a polyoxalate, or mixtures thereof.

In one embodiment of the packaging material, the barrier material comprises the reaction product of a polyepoxide and an ungelled amine-functional polymeric resin which comprises the reaction product of: (i) a polyamine characterized as having up to about two primary amino nitrogen groups per molecule; and (ii) a polyepoxide. Generally, the ratio of the ungelled amine-functional resin to polyepoxide is from about 0.1:1 to about 1:1, preferably from about 0.2:1 to about 0.8:1 based upon epoxy groups to amine hydrogens. The polyamine and the polyepoxide can be present in the reaction mixture used in forming the ungelled amine-functional polymeric resin at a ratio of from about 2:1 to about 0.83:1, preferably from about 1.4:1 to about 0.83:1 based upon moles of polyamine to moles of polyepoxide and such an ungelled amine-functional polymeric resin should contain sufficient amine nitrogen on a percent by weight basis so as to provide the thermoset barrier material with the amine nitrogen content of at least about four percent by weight. In other embodiments of the packaging material, the barrier materials may comprise the reaction product of a polyepoxide and an ungelled amine-functional polymeric resin which comprises the reaction product of: (i) a polyamine characterized as having up to about two primary amino nitrogen groups per molecule; and (ii) a polyoxalate or a polyacrylate.

In still another aspect of the present invention, a container is provided which includes at least one layer of a gas-permeable polymeric material and at least one layer of the thermoset barrier materials as previously described for use in packaging materials. Also, containers may be formed from the packaging materials of the present invention.

DETAILED DESCRIPTION OF THE INVENTION

The present invention is concerned with thermoset barrier materials, coating compositions for preparing thermoset barrier materials, and both multilayer packaging materials and multilayer containers which include at least one layer of a thermoset barrier material. The novel barrier materials of this invention are polymeric materials and may be generally based on the reaction of: (i) an ungelled amine-functional polymeric resin, which is a reaction product of a polyamine having up to about two primary amino nitrogen groups per molecule and (ii) a polyepoxide. The polyamine and polyepoxide are present in the reaction mixture at a ratio of from about 1.4:1 to about 0.83:1, preferably from about 1.25:1 to about 1.05:1, more preferably from about 1.2:1 to about 1.1:1 based upon moles of polyamine to moles of polyepoxide.

A wide variety of polyepoxides may be utilized in forming the ungelled amine-functional polyamine resin. The polyepoxides may be saturated or unsaturated, aliphatic, cycloaliphatic, aromatic, or heterocyclic and may be substituted, if desired, with noninterferring substituents such as hydroxyl groups or the like.

Examples of useful polyepoxides are polyglycidyl ethers of aromatic polyols, e.g., polyphenols. Such polyepoxides can be produced, for example, by etherification of an aromatic polyol with epichlorohydrin or dichlorohydrin in the presence of an alkali. The aromatic polyol may be, e.g., bis(4-hydroxyphenyl)-2,2-propane (generally known as bisphenol A), bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane, 4,4'-dihydroxybenzophenone, 1,5-dihydroxynaphthalene and the like. Bisphenol A is the preferred aromatic polyol in preparation of the polyepoxide.

Also suitable as the polyepoxide are polyglycidyl ethers of polyhydric aliphatic alcohols such as 1,2-ethanediol, 1,2-propanediol, 1,3-propanediol, 1,4-butanediol, 1,5-pentanediol, diethylene glycol, triethylene glycol, polyethylene glycol, polypropylene glycol and the like. Similarly, the polyhydric aliphatic alcohols may be a hydrogenated polyphenol such as 2,2-bis(4-hydroxycyclohexyl)propane and the like. The polyglycidyl ether of 1,4-butanediol is preferred from among those of polyhydric alcohols. Blends of various polyepoxides, e.g., blends of polyepoxides of aromatic polyols and aliphatic polyols, may also be used.

Generally, the polyepoxides usually have molecular weights above about 86, preferably from about 200 to about 700, and more preferably from about 200 to about 400, and have epoxy equivalent weights of above about 43, preferably from about 100 to about 350, and more preferably from about 100 to about 200. The equivalent weight of the polyepoxide is preferably minimized thereby increasing the amine nitrogen content of the resultant barrier material.

Further, a blend of a monoepoxide and a polyepoxide may be reacted in forming the ungelled amine-functional polymeric resin or a monoepoxide can be reacted with the ungelled polymeric resin after its preparation from a polyamine and a polyepoxide thereby reducing the amount of amine functionality of the resin. Suitable monoepoxides include monoepoxides such as, e.g., a $C_{16}$ alpha olefin epoxide, 2-ethylhexylglycidyl ether, butylglycidyl ether, cresyl glycidyl ether, phenyl glycidyl ether (1,2-epoxy-3-phenoxypropane), propylene oxide, ethylene oxide, glycidol (2,3-epoxy-1-propanol) and the like.

Preferably, the polyepoxide used in forming the reaction product has an average 1,2-epoxy functionality of at least about 1.4 and most preferably about 2.0, i.e., the polyepoxide is a diepoxide. The diglycidyl ethers of an aromatic polyol such as bisphenol A or an aliphatic alcohol such as 1,4-butanediol are the most preferred polyepoxides to react with the polyamine.

The polyamine used in forming the ungelled amine-functional reaction products generally has up to about two primary amino nitrogen groups per molecule but may also have other secondary or tertiary amino nitrogen groups. Polyamines with lass than two primary amino nitrogen groups per molecule may be used so long as sufficient secondary amino nitrogen groups are present. Such polyamines can be aliphatic polyamines of the formula $(R')_2N+RNH-R+N(R')_2$ wherein R is a $C_2$ to $C_6$ alkylene group, preferably a $C_2$ to $C_4$ alkylene group such as ethylene, isopropylene and the like, R' is a hydrogen, a lower alkyl group such as methyl, ethyl and the like, or a hydroxyalkyl group wherein the alkyl group contains from about one to four carbon atoms, and n is an integer from 0 to about 10, preferably from about 1 to about 5 with the proviso that the polyamine contains at least three secondary or primary amine hydrogens. Suitable examples of such polyamines include ethylenediamine, diethylenetriamine, triethylenetetramine, tetraethylenepentamine, N-hydroxyethyl ethylenediamine, N-hydroxyethyl diethylenetriamine, N,N-dihydroxyethyl diethylenetriamine and the like. The polyamine may also be an aromatic polyamine such as para-diaminobenzene, 4,4'-diaminophenylaniline and the like. The polyamine may also be a ketone blocked polyamine, sometimes referred to as a ketimine, e.g., a polyamine, such as tetraethylenepentamine, may be reacted with a ketone, such as methyl isobutyl ketone and the like, to give a polyamine having the primary amine groups blocked and three remaining reactive secondary amine groups. Diprimary amine group-containing polyamines are generally preferred, triethylenetetramine and tetraethylenepentamine are more preferred polyamines and tetraethylenepentamine is the most preferred polyamine in the reaction to form the ungelled amine-functional polymeric resin.

Ammonia may also be a precursor to a suitable polyamine, e.g., two moles of ammonia may be reacted with one mole of a suitable diepoxide, such as a diglycidyl ether of bisphenol A, to produce a diprimary amine-functional material useful in forming the ungelled amine-functional polymeric resin. The polyamine may also be polyethyleneimine and the like. Still further, the polyamine may also be a polyoxyalkylene-polyamine such as the material described in U.S. Pat. No. 4,423,166 for preparation of an ungelled material used in electrodeposition. The resultant ungelled resin should contain the sufficient amine nitrogen content. Preferably, such a product of a polyoxyalkylene-polyamine and, e.g., a polyepoxide, may derive from polyamines including greater than two amine nitrogen groups per molecule but only up to about two primary amino nitrogen groups per molecule.

The ungelled amine-functional polymeric resin can also be prepared from a mixture including: (i) a polyamine characterized as having up to about two primary amino groups per molecule and devoid of oxyalkylene moieties, and (ii) a polyepoxide. The preparation involves the slow addition of the polyepoxide, preferably a dilute polyepoxide solution, to a dilute polyamine solution at temperatures and over time sufficient to form the ungelled amine-functional polymeric resin. Preferably, the ratio of polyamine to polyepoxide is from about 1.25:1 to about 1.05:1 and more preferably from about 1.2:1 to about 1.1:1. The preparation of such an ungelled amine-functional polymeric resin is described in commonly assigned, co-pending application entitled "Ungelled Polyamine-Polyepoxide Resins" by Nugent et al, filed on the same date herewith, and the preparation of such an ungelled resin is incorporated herein by reference. Ungelled polymeric resins formed from a polyepoxide and a polyamine free of oxyalkylene moieties are especially preferred as amine-functional materials in preparation of the barrier materials of this invention as they may maximize the amine content on a percent weight basis due to lack of oxyalkylene moieties.

A polyepoxide can then be reacted with the ungelled amine-functional polymeric resin to give a cured thermoset product. Generally, such a polyepoxide may be the same as those polyepoxides previously described for forming the ungelled resin. Further, a monoepoxide may be blended with the polyepoxide that is used to cure the ungelled resin as long as sufficient polyepoxide is present to give the thermoset product.

In forming the thermoset barrier materials of this invention, i.e., reaction products of a polyepoxide and an ungelled amine-functional polymeric resin of a polyamine and a polyepoxide, such components are preferably reacted together at an equivalent ratio of epoxy groups to amine hydrogens of from about 0.1:1 to about 1:1, more preferably from about 0.2:1 to about 0.85:1, most preferably from about 0.3:1 to about 0.7:1. That is, the barrier material can include up to one epoxy equivalent per one amine equivalent. Each amine hydrogen of the ungelled amine-functional polymeric resin is theoretically able to react with one epoxy group and is considered as one amine equivalent. Thus, a primary amine nitrogen is considered as difunctional in the reaction to form the thermoset barrier material. Preferably, the thermoset reaction product contains an excess of amine hydrogen equivalents over epoxy equivalents, which provides the advantage of keeping the weight percentage of amine nitrogen in the reaction product higher thereby providing lower gas permeabilities.

By the term "ungelled", as used throughout this description, it is meant that such an amine-functional polymeric resin is a soluble or dispersible reaction product, the resin being fluid under processing conditions of the present invention.

By the term "barrier material", as used throughout this description, it is meant that such a material has a low permeability to gases such as oxygen and carbon dioxide, i.e., the material exhibits a high resistance to the flow of oxygen or carbon dioxide through the material. Permeation through a material is a function of the thickness of, e.g., a film of the material. Typically, such "barrier materials" exhibit an oxygen permeability of less than about 3.0, preferably less than about 1.0, and more preferably less than about 0.5 measured as cubic centimeters of oxygen gas permeating a one-mil thick sample, 100 inches square over a 24-hour period under an oxygen partial pressure differential of one atmosphere at 23° C. and at a relative humidity of zero. Further, such "barrier materials" exhibit a carbon dioxide permeability of less than about 15.0, preferably less than about 5.0, and more preferably less than about 2.0 measured as cubic centimeters of carbon dioxide gas permeating a one-mil thick sample, 100 inches square over a 24-hour period under a carbon dioxide partial pressure differential of one atmosphere at 23° C. and at a relative humidity of zero. In addition, such "barrier materials" may have low permeabilities to organic liquids and solvents, e.g., gasoline, toluene, methylene chloride, methyl ethyl ketone, methanol and the like.

The present invention is further concerned with packaging materials and containers formed of a barrier material or packaging materials and containers including a barrier material. Such packaging materials and/or containers generally have the following properties: (1) low oxygen permeability, e.g., for the protection of package contents such as food from external oxygen, (2) low carbon dioxide permeability, e.g., for the retention of carbon dioxide gas within a container, (3) good adhesion to gas-permeable polymeric materials used in forming multilayer packaging materials or multilayer containers, (4) retortability, i.e., the ability to withstand wet autoclaving at temperatures up to about 130° C. (the temperature of saturated steam), without blushing, loss of oxygen or carbon dioxide impermeability, or loss of adhesion, (5) good flexibility, (6) high impact resistance, (7) low processing and cure temperatures for use with heat-sensitive substrates, e.g., certain gas-permeable polymeric materials, (8) high gloss, and (9) good clarity. In addition, the barrier materials utilized in packaging materials or containers of this invention can be and are preferably characterized as halide-free.

In the packaging materials and containers of the present invention, barrier materials can ba used in combination with any polymeric material used in conventional packaging materials and containers, e.g., polyolefins such as polyethylene or polypropylene, polyesters such as poly(ethylene terephthalate), polycarbonates and the like. Many polymeric materials, such as, e.g., polyolefins and polycarbonates, are known to be very gas-permeable. The term "gas-permeable" is used herein to mean that such a polymeric material has a gas permeability greater than that of the barrier materials. Gas-permeable polymeric materials are generally more limited for use as packaging of oxygen-sensitive foods or beverages, or for packaging of carbonated beverages. The herein described barrier materials are especially suitable for use in combination with polymeric materials such as polyolefins or polycarbonates. Polyolefins and polycarbonate materials have both high oxygen permeabilities and carbon dioxide permeabilities, i.e., values generally greater than 100 cubic centimeters (cc) of oxygen and greater than 250 cc of carbon dioxide permeating a one-mil thick sample, 100 inches square over a 24-hour period under an oxygen or carbon dioxide partial pressure differential respectively of one atmosphere (100 cc-mil/100 in$^2$-day-atmosphere) at 23° C. and a relative humidity of zero. The containers or packaging materials of this invention may also incorporate one or more other polymeric materials such as, e.g., polyvinylidene chloride, polyacrylonitrile, polystyrene, acrylonitrile-styrene copolymers, polyamides, polyfluorocarbons, and blends or other combinations of such materials.

In the packaging materials and containers of this invention, the thermoset barrier materials of this invention may be a reaction product of: (i) an ungelled amine-functional polymeric resin, which is a reaction product of a polyamine and a polyfunctional material having at least two functional groups reactive with said polyamine, the ungelled resin further characterized as containing an average of greater than two polyamine moieties per molecule within said resin; and (ii) a material such as a polyepoxide, a polyoxalate, or mixtures thereof. The polyfunctional material may be a polyepoxide, a polyacrylate, a polyoxalate and the like. Such barrier materials are characterized as preferably containing at least about four percent by weight amine nitrogen, more preferably at least about seven percent by weight amine nitrogen, and most preferably at least about nine percent by weight amine nitrogen. Generally, it has been found that as the amount of amine nitrogen in a thermoset barrier material increases, gas permeability decreases. Barrier materials having at least about four percent by weight amine nitrogen can generally be further characterized as having an oxygen permeability of less than about 3 cc-mil/100 in$^2$-day-atmosphere and a carbon dioxide permeability of less than about 15 cc-mil/100 in$^2$-day-atmosphere at 23° C. and at a relative humidity of zero.

The novel barrier materials of this invention and other materials used as barrier materials in the packaging materials and containers of this invention can be formed from compositions, e.g., coating compositions, which can include as one essential component a polyepoxide, a polyoxalate or mixtures thereof. A wide variety of polyepoxides may be utilized as the polyepoxide component of such compositions, but in order to provide the cured thermoset products, the polyepoxide should have a 1,2-epoxy equivalency greater than one and preferably greater than 1.4. The polyepoxides may be saturated or unsaturated, aliphatic, cycloaliphatic, aromatic, or heterocyclic and may be substituted, if desired, with noninterferring substituents such as hydroxyl groups or the like and generally may be the same as those polyepoxides previously described.

Polyoxalates that may be utilized in such compositions to give the cured thermoset product contain at least two reactive functional groups. Among the suitable polyoxalates may be included poly(diallyl oxalate), poly(hexanediol oxalate), poly(ethylene oxalate), poly(tetramethylene oxalate), diethyl oxalate-ethylene glycol polymer, poly(trimethylene oxalate), poly(vinyl oxalate), polyethylene glycol oxalate and the like. Further, the esters of oxalic acid, such as diethyl oxalate, dibutyl oxalate and the like, are considered to be useful "polyoxalates" as the term is used herein. Esters of other dicarboxylic acids, such as malonic acid, succinic acid and the like, may also be utilized in the compositions as long as the final product contains the sufficient level of amine nitrogen.

A monoepoxide, such as, e.g., a $C_{16}$ alpha olefin epoxide, 2-ethylhexylglycidyl ether, butylglycidyl ether, cresyl glycidyl ether, phenyl glycidyl ether (1,2-epoxy-3-phenoxypropane), propylene oxide, ethylene oxide, glycidol (2,3-epoxy-1-propanol) and the like, may also be included with the polyepoxide or polyoxalate in the coating compositions as long as a sufficient amount of polyepoxide or polyoxalate is also present to provide for crosslinking and cure upon heating.

A second essential component of such compositions, e.g., coating compositions, used in forming barrier materials is an ungelled amine-functional polymeric resin, preferably a solution of an ungelled amine-functional polymeric resin. The ungelled amine-functional polymeric resin can be the reaction product of a polyamine and a polyfunctional material having at least two functional groups reactive with said polyamine. The ungelled amine-functional polymeric resin can comprise the reaction product of a polyamine and, e.g., a polyepoxide or a polyoxalate, the reaction product containing sufficient amine nitrogen so as to provide the thermoset product with at least about four percent by weight amine nitrogen. Still further, the ungelled amine-functional polymeric resin may be the reaction product of a polyamine and a polyacrylate. The ungelled amine-functional polymeric resins are typically characterized as thermoplastic, i.e., such a polymeric resin softens upon heating but substantially returns to its original condition upon cooling to room temperature. That is, such a resin may undergo minor branching or crosslinking upon heating but such a resin remains essentially uncured and accordingly may be redissolved.

The polyepoxide, used as the polyfunctional material in forming such an ungelled amine-functional polymeric resin, may also generally be the same as any of those polyepoxides previously described except such a polyepoxide must have at least two groups reactive with the polyamine. Further, a blend of a monoepoxide and polyepoxide may be reacted in forming the ungelled amine-functional polymeric resin or a monoepoxide can be reacted with the ungelled polymeric resin after its preparation from a polyamine and a polyepoxide thereby reducing the amount of amine functionality of the resin. Preferably, the polyepoxide used in forming the reaction product has an average 1,2-epoxy functionality of at least about 1.4 and most preferably about 2.0, i.e., the polyepoxide is a diepoxide. Diglycidyl ethers of an aromatic diol, such as bisphenol A, or an aliphatic diol, such as 1,4-butanediol, are the most preferred polyepoxides to react with the polyamine.

A polyacrylate may be used in forming such a reaction product, i.e., an ungelled amine-functional polymeric resin. Such a polyacrylate may be a polyacrylate ester of a polyol or a polymethacrylate ester of a polyol, such esters containing at least two terminal acrylate or methacrylate groups per molecule. Such esters include the acrylic acid and methacrylic acid esters of aliphatic polyhydric alcohols, preferably dihydric alcohols. Such alcohols may be, e.g., alkylene glycols such as 1,2-ethanediol, 1,3-propanediol, 1,4-butanediol, 1,6-hexanediol and the like, or polyalkylene glycols such as diethylene glycol, triethylene glycol, tetraethylene glycol and the like. Typical compounds include, e.g., 1,4-butanediol diacrylate, 1,4-butanediol dimethacrylate, 1,6-hexanediol diacrylate, 1,6-hexanediol dimethacrylate, triethylene glycol diacrylate, triethylene glycol dimethacrylate and the like.

A polyoxalate or other suitable polycarboxalate may also be used in forming the ungelled amine-functional polymeric resin. Such polyoxalates may be the same as those described for reaction with the ungelled resins.

The polyepoxides, polyacrylates, polyoxalates and the like, optionally with monoepoxide, are reacted with a polyamine to give the ungelled amine-functional polymeric resin. Suitable polyamines have been previously described in the preparation of the novel barrier materials of this invention.

The reaction of the polyfunctional material and the polyamine to give the ungelled resin is carried out at temperatures and concentrations of reactants sufficient to obtain the ungelled product and may vary depending upon selection of starting materials. Generally, reaction temperatures may vary from about 40° C. to 140° C. with lower temperatures (40° C. to 110° C.) being preferred for systems susceptible to gelation. Similarly, concentrations of reactants may vary from neat to as low as five percent by weight of reactant in an appropriate solvent depending upon the particular molar ratio and type of reactants. Lower concentrations will generally be required for systems susceptible to gelation. Specific reaction conditions may be readily chosen by one skilled in the art.

The ungelled amine-functional polymeric resins are described throughout this specification as containing an average of greater than two polyamine moieties within said resin. By "polyamine moiety" is meant by that portion of a polyamine molecule which remains after reaction with the polyfunctional material. Thus, the ungelled polymeric resins contain an average of greater than two separate polyamine portions. An example would be the product of four moles of a diprimary amine-containing polyamine reacted with three moles of a diepoxide, such a product containing an average of about four polyamine moieties.

A solution of the ungelled amine-functional polymeric resin includes a suitable solvent, preferably an oxygenated solvent, such as glycol ethers, e.g., 2-methoxyethanol, 2-ethoxyethanol, 2-propoxyethanol, 2-butoxyethanol, 1-methoxy-2-propanol and the like, or alcohols such as methanol, ethanol, propanol and the like. Glycol ethers, such as 2-butoxyethanol and 1-methoxy-2-propanol, are more preferred with 1-methoxy-2-propanol being most preferred. The solvent may also be a halogenated hydrocarbon, for example, a chlorinated hydrocarbon, such as methylene chloride, 1,1,1-trichloroethane and the like (usually considered fast evaporating solvents), may be especially useful in obtaining cured barrier films. Mixtures of such solvents may also be employed. Non-halogenated solvents are preferred where the resultant thermoset barrier material is desired to be halide-free. The resin may also be in an aqueous medium, i.e., the ungelled amine-functional polymeric resin may be an aqueous solution or dispersion. For example, when the polyepoxide used in forming the reaction product is a water-soluble polyepoxide, e.g, the polyglycidyl ether of an aliphatic diol such as butanediol, the ungelled amine-functional polymeric resin can be utilized as an aqueous solution. Otherwise, with water-insoluble polyepoxides, the ungelled amine-functional polymeric resin can have sufficient amine groups neutralized with an organic acid, such as formic acid, lactic acid, or acetic acid, or with an inorganic acid, such as hydrochloric acid or phosphoric acid, to allow solubilization of the ungelled amine-functional polymeric resin in an aqueous mediums. An organic acid is preferably used.

The barrier materials can be applied as either solvent or aqueous-based thermosetting coating compositions onto other polymeric materials, e.g., packaging materials or containers, by any conventional means such as spraying, rolling, dipping, brushing and the like. Spray applications or roll applications are preferred. For example, conventional spray techniques and equipment for applying curable coating components can be utilized.

Generally, the ungelled amine-functional polymeric resin component of the coating composition, i.e., the solution of the ungelled amine-functional polymeric resin, will have a weight percent of resin solids in the range of from about 15 percent by weight to about 50 percent by weight, preferably from about 25 to about 40 percent by weight. Higher weight percent solids may present application difficulties, particularly with spray application, while lower weight percentages will require removal of greater amounts of solvent during a heat-curing stage.

The ungelled amine-functional polymeric resin should contain sufficient amine-functionality so that the thermoset barrier material will contain at least about four percent by weight amine nitrogen, preferably at least about seven percent by weight amine nitrogen, and more preferably at least about nine percent by weight amine nitrogen. While not wishing to be bound by the present explanation, it is believed that greater levels of amine nitrogen in the barrier material contributes to lower gas permeabilities. It is further believed that the level of hydroxyl functionality in the cured product may also contribute to low gas permeabilities. Additionally, greater levels of amine nitrogen are believed to aid in adhesion of the barrier materials to other polymeric materials, e.g., gas-permeable polymeric materials.

In forming thermoset barrier materials which are reaction products of a polyepoxide and an ungelled amine-functional polymeric resin formed from a polyamine and either a polyoxalate or a polyacrylate, or reaction products of a polyoxalate and an ungelled amine-functional polymeric resin formed from a polyamine and a polyepoxide, such reaction components are preferably reacted together at an equivalent ratio of epoxy groups or oxalate groups to amine hydrogens of from about 0.8:1 to about 1:1, more preferably at about 1:1. That is, in contrast to the substoichiometric ratio preferred in barrier materials based on polyepoxides and polyamines, barrier materials including a polyacrylate or polyoxalate in the composition are preferably reacted at or near stoichiometric ratios.

Coating compositions of this invention can further include other additives including pigments, catalysts for coating compositions which involve an epoxy-amine reaction, silicones or surfactants. For example, the addition of pigments can further reduce the gas permeability of the resultant barrier material. Among the useful pigments in decreasing the gas permeabilities may be included titanium dioxide, micas, silica pigments, talc and aluminum or glass particulates, e.g., flakes. Micas, aluminum flakes and glass flakes may be preferred due to a plate-like structure of such pigments. Generally, when pigments are included in the coating compositions, the weight ratio of pigment to binder is about 1:1, preferably about 0.3:1, and more preferably about 0.05:1, the binder weight being the total weight of, e.g., the polyepoxide and the ungelled amine-functional polymeric resin in the coating composition.

Silicones may be included in coating compositions of this invention to assist in wetting of gas-permeable polymeric surfaces. Suitable silicones include various organosiloxanes such as polydimethylsiloxane, polymethylphenylsiloxane and the like. Exemplary are SF-1023 silicone (a polymethylphenylsiloxane available from General Electric Co.), AF-70 silicone (a polydimethylsiloxane available from General Electric Co.), and DF-100 S silicone (a polydimethylsiloxane available from Mazer Chemicals, a division of PPG Industries, Inc.) Such silicones may be added to the coating compositions in amounts of from about 0.1 to about 1.0 percent by weight based on total resin solids in the composition.

Surfactants may be included in aqueous-based coating compositions of the present invention, such as when the ungelled amine-functional polymeric resins are in aqueous solution. Such surfactants may generally be any suitable nonionic or anionic surfactant and may be employed at levels of about 0.01 to about 1 percent by weight basis total weight of the solution.

Among the catalysts which may be included in the coating compositions are those generally used for epoxy-amine reactants such as dihydroxy aromatics, e.g., resorcinol, triphenyl phosphite, calcium nitrate and the like.

In application of a thermosetting coating composition onto a substrate to form a layer of a barrier material, the components of a coating composition, e.g., a polyepoxide and the ungelled amine-functional polymeric resin, are first thoroughly mixed and then applied by appropriate means such as spraying. After mixing, the coating composition can also be held for a period of time (referred to as a digestion time) from about 5 minutes to about 60 minutes prior to application to improve cure and clarity. This digestion time can generally be eliminated when the ungelled amine-functional polymeric resin is, e.g., an adduct formed with tetraethylenepentamine or when the solvent is 2-butoxyethanol. After application of the coating composition, it can be cured by heating at temperatures from about 130° Fahrenheit (F) to about 230° F., preferably from about 160° F. to about 200° F. for from about 1 minute to about 60 minutes. Optionally, the coating composition may be cured at temperatures as low as ambient temperature, i.e., about 70° F., by allowing for a gradual cure over several hours to several days or longer. Generally, such low temperature curing is not as efficient in removing solvent from the cured coating. The thermosetting coating composition may be applied and cured as a single layer or may be applied as multiple layers with multiple heating stages to remove solvent from each subsequent layer.

Multilayer packaging materials of the present invention comprise at least one layer of a gas-permeable polymeric material and at least one layer of a thermoset barrier material characterized as containing at least about four percent amine nitrogen. The barrier material can be the reaction product of, e.g., (1) a polyepoxide and (2) an ungelled amine-functional polymeric resin, as previously described. In the preparation of the multilayer packaging material, a layer of the gas-permeable polymeric material can be coated with a layer of a thermo-setting coating composition of the barrier material, e.g., by roll coating or spraying, and the layer of the coating compositions can then be cured to form the thermoset barrier layer by heating for a sufficient time at sufficient temperatures. The heating temperatures will generally be beneath the temperature at which the gas-permeable polymeric material suffers any detrimental effects, such as distortion, discoloration or degradation. Generally, the coating composition can be cured to the resultant thermoset layer by heating at temperatures from about 130° F. to 230° F., preferably from about 160° F. to 200° F., for from about 1 minute to about 60 minutes, preferably about 5 minutes to about 30 minutes.

In another embodiment of the invention, a laminate including a thermoset barrier layer may be formed, e.g., by spray application of the coating composition, onto a first layer of a gas-permeable polymeric material. Thereafter, a second layer of a similar or dissimilar gas-permeable polymeric material may be applied over the barrier layer to form a laminate and heated as previously described or optionally heated under pressure. For example, such a laminate may be pressed under pressures of from about 5 to about 200 pounds per square inch (psi).

In a preferred embodiment of a multilayer packaging material in accordance with the present invention, polypropylene is the gas-permeable polymeric material. The surface of the polypropylene (or any other polyolefin) is preferably treated to increase surface tension by, e.g., flame-treating, corona-treating and the like, all of which are well known to those skilled in the art. Such treatments are described in detail by Pinner et al, in Plastics: Surface and Finish, Butterworth & Co. Ltd. (1971), Chapter 3, on surface treatments for plastic films and containers, and this description of surface treatments is herein incorporated by reference. Such treatments promote better adhesion of the barrier layer to polyolefin material.

Then, the thermoset barrier layer is formed upon the treated polypropylene from a coating composition including, e.g., a polyepoxide such as a diglycidyl ether of bisphenol A as one component and, as a second component, a solution containing about 20 percent by weight of an ungelled amine-functional polymeric resin comprised of the reaction product of a diglycidyl ether of bisphenol A and tetraethylenepentamine, such ungelled amine-functional polymeric resin having a number average molecular weight of about 3600 and an amine nitrogen content of about 13.7, based on total weight of solvent and resin in solution, the solvent being 1-methoxy-2-propanol. The two-package coating composition is mixed and either rolled or sprayed onto the treated polypropylene to give about a one-mil thick coating of the barrier material. The layer of barrier material coating is cured by heating at about 160° F. for about 10 minutes.

The above-described multilayer packaging materials may be formed into containers by conventional plastic processing techniques. For example, sheets, films, and other structures may be formed by well known lamination or extrusion techniques. Film or sheet material made from the multilayer packaging material may be formed into articles such as wrappers, bags and the like. Molded containers may be made from the above-described packaging materials by blow molding the packaging material or by other such molding techniques all of which are well-known in the art.

Optionally, containers including at least one layer of a gas-permeable polymeric container can be preformed into any desired shape and then at least one layer of a thermoset barrier material can be applied in a similar manner as described for the multilayer packaging materials, onto the preformed container. The multilayer containers and multilayer packaging materials of the present invention are ideally suited for packaging of food, beverages, medicines and like substances. The principal advantage of the packaging materials and containers of this invention is the low gas permeability relative to the gas permeability of the gas-permeable polymeric materials.

The multilayer packaging material and containers of the present invention do not require the use of adhesives, tie layers or the like between the respective gas-permeable polymeric materials and the barrier materials.

While barrier materials of this invention have been described as useful as coatings on a variety of gas permeable polymeric materials, it should be readily apparent to those reading this specification that such barrier materials may be utilized otherwise than with gas permeable polymeric materials and may be useful, e.g., as coatings on metal surfaces whereat contact with, e.g., oxygen, is sought to be minimized. Such barrier materials may also be used without any other polymeric material. For example, such barrier materials may be formed into thin films such as those films commonly sold for home use storage of, e.g., food items in refrigerators and/or freezers.

The present invention is more particularly described in the following examples which are intended as illustration only since numerous modifications and variations will be apparent to those skilled in the art. Examples A-J describe the preparation of the ungelled aminefunctional polymeric resins that are polyamine-polyepoxide reaction products or polyamine-polyacrylate reaction products, such resins for use in forming the thermoset barrier materials.

Testing Procedures

Oxygen permeabilities, i.e., oxygen gas transmission rates through plastic films, composites and/or laminates were determined in accordance with ASTM D-3985-81.

Carbon dioxide permeabilities, i.e., carbon dioxide transmission rates through plastic films, composites and/or laminates were determined using a MULTI-TRAN 800 film permeation test system, available from Modern Controls, Inc. (Minneapolis, MN). Such a test system utilizes a thermal conductivity detector for gas sample analysis with helium as the carrier gas. All test gases were dried via appropriate means so that the test conditions were at zero percent relative humidity.

EXAMPLE A

An ungelled amine-functional polymeric resin (an epoxy-amine adduct), was prepared by the following procedure: A reaction vessel was charged with one mole (146 grams (g)) of triethylenetetramine (TETA) and 897 g of 1-methoxy-2-propanol, available from Dow Chemical Company as DOWANOL PM (14 percent by weight TETA in the total charge) and the admixture was heated to 100° C. under a nitrogen atmosphere. A mixture of 0.85 mole (320 g) of a diglycidyl ether of bisphenol A (available as EPON 828 from Shell Chemical Corporation (molecular weight of 376.47)) and 1963 g of 1-methoxy-2-propanol was then gradually added over one hour. The reaction mixture was held at 100° C. for two hours, followed by heating at 110° C. to strip solvent. The resultant product had a theoretical molecular weight of about 3200, a percent solids as measured at 110° C. for one hour of 39.9 percent and a theoretical amine nitrogen content of about 12.3 percent basis total resin solids.

EXAMPLE B

Example A was repeated with the exception that 2-butoxyethanol was the solvent. The unstripped product had a measured total solids of 15.1 percent.

EXAMPLE C

An ungelled amine-functional polymeric resin was prepared as follows: A reaction vessel was charged with 146 g of TETA and 584 g of 1-methoxy-2-propanol and the admixture was heated under nitrogen to 100° C. A mixture of 172 g of a 1,4-diglycidyl ether of butanediol (available as ARALDITE RD-2 from Ciba-Geigy Corporation) and 687 g of 1-methoxy-2-propanol was gradually added over one hour. The reaction mixture was held at 100° C. for two hours, followed by heating at 110° C. to strip solvent. The resultant product had a theoretical molecular weight of about 2200, a percent solids as measured at 110° C. for one hour of 29.2 percent and a theoretical amine nitrogen content of about 17.8 percent basis total resin solids.

EXAMPLE D

Example C was repeated with the exceptions that 2-butoxyethanol was the solvent and the amounts of materials were doubled. The unstripped product had a measured total solids of 18.68 percent.

EXAMPLE E

An ungelled amine-functional polymeric resin was prepared as follows: A reaction vessel was charged with 1.2 moles (123.6 g) of diethylenetriamine (DETA) and 700 g of 1-methoxy-2-propanol. The admixture was heated under nitrogen to 100° C. and a mixture of 1.02 mole (384 g) of EPON 828 and 2173 g of 1-methoxy-2-propanol was added over one hour. The reaction mixture was held at 100° C. for a total of about two hours, followed by heating at 110° C. to strip solvent. The resultant product had a theoretical molecular weight of about 3000, a percent solids as measured at 110° C. for one hour of 32.5 percent and a theoretical amine nitrogen content of about 9.8 percent basis total amine solids.

EXAMPLE F

Example E was repeated with the exception that 2-butoxyethanol was the solvent. The unstripped product had a measured total solids of 15.31 percent.

EXAMPLE G

An ungelled polymeric resin was prepared as follows: A reaction vessel was charged with 1 mole (189 g) of tetraethylenepentamine (TEPA) and 1161 g of 1-methoxy-2-propanol. The admixture was heated under nitrogen to 100° C. and a mixture of 0.857 mole (322.2 g) of EPON 828 epoxy and 1979 g of 1-methoxy-2-propanol was added over one hour. The reaction mixture was then held at 100° C. for a total of about two hours, followed by vacuum stripping of solvent at about 80° C. The resultant product had a theoretical molecular weight of about 3600, a percent solids as measured at 110° C. for one hour of 30.1 percent, a theoretical equivalent weight per amine hydrogen of 96.7 g and a theoretical amine nitrogen content of about 13.7 percent basis total resin solids.

EXAMPLE H

Example G was repeated with the exception that 2-butoxyethanol was the solvent. The unstripped product had a measured solids of 15.0 percent.

EXAMPLE I

An ungelled amine-functional polymeric resin (an amine-acrylate adduct) was prepared as follows: A reaction vessel was charged with 146 g of TETA and 584 g of 2-butoxyethanol and the admixture was heated under nitrogen to about 100° C. A mixture of 169.5 g of 1,6-hexanediol diacrylate (0.75 mole) and 678 g of 2- butoxyethanol was gradually added over one hour. The reaction mixture was held at 100° C. for two hours. The resultant product had a theoretical molecular weight of about 1262, a theoretical equivalent weight per amine hydrogen of 70.1, a theoretical amine nitrogen content of 17.7 percent, and a percent solids as measured at 110° C. for one hour of 18.5 percent. Such an amine-acrylate adduct may be crosslinked with, e.g., a polyepoxide to yield a thermoset barrier material.

EXAMPLE J

An ungelled polymeric resin was prepared as follows: A reaction vessel was charged with 1 mole (189 g) of tetraethylenepentamine (TEPA) and 1161 g of 1-methoxy-2-propanol. The admixture was heated under nitrogen to 100° C. and a mixture of 0.857 mole (322.2 g) of EPON 828 epoxy and 1979 g of 1-methoxy-2-propanol was added over one hour. The reaction mixture was then held at 100° C. for a total of about two hours, followed by vacuum stripping at about 80° C. The resultant product had a percent solids as measured at 110° C. for one hour of 25.2 percent, a theoretical equivalent weight per amine hydrogen of 96.7 g and a theoretical amine nitrogen content of about 13.7 percent basis total resin solids.

This adduct was than reacted with a monoepoxide thereby reducing the amine equivalents in the product as follows: A total of 500 g of the adduct at 25.2 percent by weight resin solids in 1-methoxy2-propanol was charged into a reaction vessel equipped with a nitrogen sparge. The charge was heated to about 50° C. whereupon 28.9 g of glycidol was slowly added dropwise while maintaining the resultant exotherm under 100° C. After the glycidol addition was complete, the reaction mixture was heated at 100° C. for one hour. The resultant product has a percent solids as measured at 110° C. for one hour of 31.6 percent, a theoretical equivalent weight per amine hydrogen of 169.8 g and a theoretical amine nitrogen content of 11.1 percent basis total resin solids.

Examples 1–8 illustrate the preparation of the thermoset barrier materials of this invention and their gas-barrier properties. Example 9 illustrates the solvent barrier properties of the thermoset barrier materials.

EXAMPLE 1

Barrier materials were coated onto a polypropylene sheet at various equivalent ratios of polyepoxide to amine-functional material.

A

A one-mil thick film of polypropylene with one corona-treated surface having a surface tension of about 40 to 42 dynes/centimeter (available from Phillips Joanna, a division of Joanna Western Mills Company as PJX-2135 polypropylene film) was coated with a two-package coating composition including: (1) the ungelled amine-functional polymeric resin from Example G and (2) a diglycidyl ether of bisphenol A having an epoxy equivalent weight of about 188 (available as EPON 828 from Shell Chemical Company). The ungelled amine-functional polymeric resin (75 grams total of a 30.1 percent by weight resin solution in 1-methoxy-2-propanol) was stirred with a high-intensity mixer as 43.9 g of EPON 828 epoxy was added. The equivalent ratio of epoxy groups to amine hydrogen equivalents in this mixture was about 1:1. The mixture was held for 20 minutes and then about a one-mil thick coating layer was drawndown by a roll bar onto the treated surface of the polypropylene. The coated film was heated at 160° F. (about 71° C.) for 20 minutes and yielded a flexible, clear film of the barrier material having a high gloss. The coated film was tested for oxygen and carbon dioxide permeabilities and the results are given in Table 1.

B

A one-mil thick film of polypropylene as in "A" was coated with the two-package coating composition as above except the amount of EPON 828 epoxy was reduced to 23.7 g. The equivalent ratio of epoxy groups to amine hydrogen equivalents in this mixture was 0.54:1. The coated film, drawndown and heated as above, yielded a flexible, clear film of the barrier material having a high gloss. A sample of this coating sprayed onto a titanium dioxide-pigmented polypropylene substrate at a thickness of about 0.8 to about 1.0 mils and heated for 20 minutes at 160° F. had a gloss of 40 to 45 percent at 20° and of 100 to 110 percent at 60° in comparison to 9 percent and 30 percent respectively for the uncoated polypropylene substrate. Gloss measurements were made with gloss meters manufactured by the Gardner Instrument Company. The results of testing for oxygen and carbon dioxide permeabilities are given in Table 1.

C

A one-mil thick film of polypropylene as in "A" was coated with the two-package coating composition as above except the amount of EPON 828 epoxy was reduced to 11.86 g. The equivalent ratio of epoxy groups to amine hydrogen equivalents in this mixture was 0.27:1. The coated film, drawndown and heated as above, yielded a flexible, clear film of the barrier material having a high gloss. The results of testing are given in Table 1.

D

A one-mil thick film of polypropylene as in "A" was coated with a two-package coating composition including: (1) an ungelled aminefunctional polymeric resin similar to that of Example G and (2) EPON 828 epoxy. The ungelled amine-functional polymeric resin (50 g total of a 28.0 percent by weight resin solution in 1-methoxy-2-propanol) was stirred with a high-intensity mixer as 3.67 g of EPON 828 epoxy was added, followed by addition of 0.088 g (0.5 percent by weight on total resin solids in solution) of polydimethylsiloxane (available as SF-1023 from General Electric Co.) The equivalent ratio of epoxy groups to amine hydrogen equivalents in this mixture was about 0.135:1. The mixture was applied and heated as in "A" except two layers, each about 0.4 to 0.5 mils thick, were sequentially drawndown and heated. The resultant barrier film was clear, flexible and had a high gloss. The coated film was tested for oxygen and carbon dioxide permeabilities and the results are given in Table 1.

E

A one-mil thick film of polypropylene as in "A" was coated with a two-package coating composition including: (1) an ungelled aminefunctional polymeric resin of Example J except the solvent was 2-butoxyethanol and (2) EPON 828 epoxy. The ungelled amine-functional polymeric resin (50 g total of a 31.6 percent by weight resin solution) was stirred as 3.67 g of EPON 828 epoxy was added, followed by addition of 0.097 g SF-1023 silicone. The equivalent ratio of epoxy groups to amine hydrogen equivalents in this mixture was about 0.21:1. The mixture was applied and heated as in "A" to give a resultant clear barrier film having high gloss, good flexibility and a dried film thickness of barrier material of about 0.6 to 0.7 mils. The coated film was tested for oxygen and carbon dioxide permeabilities and the results are given in Table 1.

COMPARATIVE EXAMPLE 2

A polypropylene film as in Example 1 was coated with a mixture of a commercially available epoxy-amine adduct and an amount of EPON 828 epoxy sufficient to give a 1:1 equivalent ratio of epoxy groups to amine hydrogen equivalents. The epoxy-amine adduct (50 g total of a 42 percent by weight resin solids solution available as C-112 epoxy curing agent from Shell Chemical Company) was mixed with 47 g of EPON 828 epoxy. The coated film, drawndown and heated as in Example 1, gave a flexible, clear coating. The testing results on this coated film and those of an uncoated samples of the polypropylene are given in Table 1.

TABLE 1

| Example | % Amine N in Coating | $O_2$ Permeability (cc-mil/100 in$^2$-day-atmosphere at 23° C. and 0% R.H.) | $CO_2$ Permeability |
|---|---|---|---|
| 1A | 4.65 | 3.1 | 13.9 |
| 1B | 6.7 | 2.9–3.4 | 9.6–10.7 |
| 1C | 9.0 | 2.1 | 2.8–3.1 |
| 1D | 10.9 | 0.5 | 0.0 |
| 1E | 9.0 | 0.1 | 0.2 |
| Comp. 2 | 3.55 | 5.5 | — |
| Polypropylene | — | 155 | — |

EXAMPLE 3

Samples of the corona-treated polypropylene film as in Example 1 were coated with a two-package coating composition including: (1) the ungelled amine-functional polymeric resin from Example D and (2) EPON 828 epoxy. The ungelled amine-functional polymeric resin (50 grams total of an 18.68 percent by weight resin solution in 2-butoxyethanol) was mixed with 23.8 g of EPON 828 epoxy to form a coating composition, and heated as in Example 1 with the exception that heating was for 30 minutes. One coated film sample was clamped between two pieces of expanded aluminum metal and placed in boiling water for about one hour to study the effect of retort. Adhesion between the barrier material and the polypropylene was unaffected. Results of the testing on samples before and after retort are given in Table 2.

EXAMPLE 4

Samples of polypropylene film were coated as in Example 1 with a two-package coating composition including: (1) the ungelled amine-functional polymeric resin of Example F and (2) a diglycidyl ether of butanediol having an epoxy equivalent weight of 102 (available as ARALDITE RD-2 from Ciba-Geigy Corporation). The ungelled amine-functional polymeric resin (50 g total of a 15.31 percent by weight resin solution in 2-butoxyethanol) was mixed with 6.1 g of RD-2 epoxy to form a coating composition, which was drawndown and heated as in Example 3. One coated film sample was subjected to boiling water as in Example 3 and results of testing on the samples are given in Table 2.

EXAMPLE 5

A polypropylene film was coated as in Example 3 with a two-package coating composition including: (1) the ungelled amine-functional polymeric resin of Example B and RD-2 epoxy. The ungelled amine-functional polymeric resin (50 g total of a 15.1 percent by weight resin solution in 2-butoxyethanol) was mixed with 7.14 g of RD-2 epoxy to form a coating composition which was drawndown and heated as in Example 3. Results of testing on the coated film are in Table 2.

EXAMPLE 6

A polypropylene film was coated as in Example 3 with a two-package coating composition including: (1) the ungelled amine-functional polymeric resin of Example B and (2) a blend of aromatic and aliphatic epoxies. The ungelled amine-functional polymeric resin (50 grams total of a 15.1 percent by weight resin solution in 2-butoxy-ethanol) was mixed with 0.38 epoxy equivalents of RD-2 epoxy and 0.62 epoxy equivalents of EPON 828 epoxy per one amine hydrogen equivalent (a total of 2.88 g RD-2 epoxy and 8.77 g of EPON 828 epoxy) to form a coating composition which was drawndown and heated as in Example 3. Results of testing are given in Table 2.

EXAMPLE 7

A polypropylene film was coated as in Example 3 with a two-package coating composition including: (1) the ungelled amine-functional polymeric resin of Example B and (2) a 1 to 1 by epoxy equivalents blend of an aromatic and an aliphatic epoxy. The ungelled amine-functional polymeric resin (50 g total of an 18.68 percent by weight resin solution in 2-butoxyethanol) was mixed with 6.45 g of RD-2 epoxy and 11.38 g of EPON 828 epoxy to form a coating composition as in Example 3 which was drawndown and heated as in Example 3. Results of testing on the coated film are given in Table 2.

TABLE 2

| Example | % Amine Nitrogen in Coating | Coating Film Thickness (mils) | $O_2$ Permeability (cc-mil/100 in$^2$-day-atm at 23° C. and 0% R.H.) | | Adhesion Loss (percent) |
|---|---|---|---|---|---|
| | | | before retort | after retort | |
| 3 | 4.97 | 0.3–0.35 | 2.8 | 2.7 | 0 |
| 4 | 6.00 | 0.1–0.15 | 1.8 | 1.7 | 0 |
| 5 | 6.20 | 0.1 | 1.2 | — | 0 |
| 6 | 4.78 | 0.25 | 2.6 | — | 0 |
| 7 | 5.94 | 0.65 | 2.8 | — | 0 |

EXAMPLE 8

Corona-treated polypropylene film samples were coated with 18.7 g of an ungelled amine-functional polymeric resin prepared from a ratio of TETA and RD-2 epoxy of 7:6 in 81.3 g of 2-butoxyethanol (100 grams total), a blend of polyepoxides (12.9 g of RD-2 epoxy and 23.8 g of EPON 828 epoxy) and, optionally, titanium dioxide pigment to give clear and colored barrier coatings. The ungelled amine-functional polymeric resin was mixed with the polyepoxide blend and, optionally, the pigment. Application of the coating composition was by drawdown onto the polypropylene film. The coated films were then baked for 20 minutes at 160° F. Results of testing these samples is shown in Table 3 and demonstrate the reduction of oxygen permeability by addition of pigment.

TABLE 3

|  | Parts by Weight (grams) | |
| --- | --- | --- |
|  | 1A | 1B |
| Coating Ingredients |  |  |
| Ungelled amine-functional polymeric resin | 18.7 | 18.7 |
| 2-butoxyethanol | 81.3 | 81.3 |
| Polyepoxide blend | 36.7 | 36.7 |
| Titanium dioxide | — | 55.33 |
| Properties |  |  |
| Coating film thickness | 0.8–1.2 | 0.8–1.0 |
| $O_2$ permeability (cc-mil/100 in$^2$-day-atm) | 3.4 | 1.9 |
| Adhesion (% loss) | 0 | 1 |
| Adhesion after retort (% loss) | 0 | 10 |

EXAMPLE 9

A coating was applied to a high-density polyethylene bottle that had been surface-treated on the interior surfaces by a fluoridation process as described in U.S. Pat. No. 3,862,284 with the exception that a small amount of oxygen was added to the fluorine-containing nitrogen stream to provide a fluoridation/oxidation of the bottle surface. The interior bottle surface had a surface tension of about 50 dynes/centimeter. The coating included an ungelled amine-functional polymeric resin similar to Example C (the resin having a theoretical molecular weight per amine hydrogen of 73.9), a tetrafunctional sorbitol-based polyepoxide having an epoxy equivalent weight of 172 (available as ARALDITE XU GY 358 aliphatic polyepoxide from Ciba-Geigy Corporation), and a small amount of a red dye to check uniformity of the resultant coating. The ungelled polymeric resin (20.2 g of a 29.7 percent by weight solution in 1-methoxy-2-propanol) was stirred with a high-intensity mixer as 14.0 g of the polyepoxide was added. The interior of the bottle was coated by dipping in the coating composition, allowing excess coating composition to drain off and heating at 200° F. for 15 minutes.

One bottle with a 0.4 mil thick coating, one bottle with a 1.0 mil thick coating and an uncoated bottle were each filled with a methylene chloride-containing composition (Paint Stripper No. 99 from Red Devil). After 50 days at ambient temperature, the uncoated bottle had a weight loss of about 1.7 to 1.8 percent, the 1.0 mil coated bottle had a weight loss of about 1.5 percent and the 0.4 mil coated bottle had a weight loss of about 0.8 percent. Adhesion of the coatings to the bottles was good both before and after contact with the methylene chloride.

Although the present invention has been described with reference to specific details, it is not intended that such details should be regarded as limitations upon the scope of the invention, except as and to the extent they are included in the accompanying claims.

We claim:

1. A multilayer packaging material comprising:
    (a) at least one layer of a gas-permeable polymeric material; and
    (b) at least one layer of a thermoset barrier material comprised of a reaction product of: (i) an ungelled amine-functional polymeric resin which is a reaction product of a polyamine and a polyepoxide, the polyamine and the polyepoxide present in the reaction mixture at a ratio of from about 1.4:1 to about 0.83:1 based upon moles of polyamine to moles of polyepoxide, the ungelled polymeric resin further containing an average of greater than two polyamine moieties per molecule within said resin; and (ii) a material selected from the group consisting of a polyepoxide, a polyoxalate and mixtures thereof, the polymeric barrier material further characterized as containing at least about seven percent by weight amine nitrogen based on the total weight of polymeric barrier material and having an oxygen permeability of less than about 3 cc-mil/100 in$^2$-day-atmosphere and a carbon dioxide permeability of less than about 15 cc-mil/100 in$^2$-day-atmosphere at 23° C. and zero percent relative humidity.

2. The packaging material of claim 1 wherein the polyamine is an aliphatic polyamine selected from the group consisting of ethylenediamine, diethylenetriamine, triethylenetetramine and tetraethylenepentamine.

3. The packaging material of claim 1 wherein the polyamine is tetraethylenepentamine.

4. The packaging material of claim 2 wherein the polyepoxide reacted with the polyamine to form the ungelled amine-functional polymeric resin is a diglycidyl ether of either an aromatic diol or an aliphatic diol.

5. The packaging material of claim 4 wherein the polyepoxide reacted with the ungelled amine-functional polymeric resin to form the thermoset barrier material is a polyglycidyl ether of either an aromatic polyol or an aliphatic polyol.

6. The packaging material of claim 1 wherein the gas-permeable polymeric material is a polyolefin.

7. The packaging material of claim 1 wherein the gas-permeable polymeric material is a polyolefin.

8. A container formed from the multilayer packaging material of claim 7.

9. The packaging material of claim 1 wherein the gas-permeable polymeric material is a polycarbonate.

10. The packaging material of claim 1 wherein the gas-permeable polymeric material is a polycarbonate.

11. A container formed from the multilayer packaging material of claim 10.

12. The packaging material of claim 1 wherein the gas-permeable polymeric material is a polyester.

13. The packaging material of claim 1 wherein the gas-permeable polymeric material is a polyester.

14. A container formed from the multilayer packaging material of claim 13.

15. The packaging material of claim 1 wherein the thermoset barrier layer further includes a pigment capable of lowering the gas permeability of said layer.

16. A container having an inner surface and an outer surface, the container comprising:
    (a) at least one layer of a gas-permeable polymeric material; and
    (b) at least one layer of a thermoset polymeric barrier material comprised of a reaction product of: (i) an ungelled amine-functional polymeric resin which is a reaction product of a polyamine and a polyepoxide, the polyamine and the polyepoxide present in the reaction mixture at a ratio of from about 1.4:1 to about 0.83:1 based upon moles of polyamine to moles of polyepoxide, the ungelled polymeric resin further containing an average of greater than two polyamine moieties per molecule within said resin; and (ii) a material selected from the group consisting of a polyepoxide, a polyoxalate or mixtures thereof, the polymeric barrier material further characterized as containing at least about seven percent by weight amine nitrogen based on the total weight of polymeric barrier material and having an oxygen permeability of less than about 3 cc-mil/100 in$^2$-day-atmosphere and a carbon dioxide permeability of less than 15 cc-mil/100 in$^2$-day-atmosphere at 23° C. and zero percent relative humidity.

17. The container of claim 16 wherein the barrier layer is situated as the outer surface.

18. The container of claim 16 wherein the barrier layer is situated as the inner surface.

19. The container of claim 16 wherein the gas-permeable polymeric material is a polyolefin.

20. The container of claim 16 wherein the gas-permeable polymeric material is a polycarbonate.

21. The container of claim 16 wherein the gas-permeable polymeric material is a polyester.

22. The container of claim 19 wherein the ungelled amine-functional polymeric resin comprises a reaction product of a polyamine having up to about two primary amino nitrogen groups per molecule and a polyepoxide, the polyamine and polyepoxide present in the reaction mixture at a ratio of from about 1.4:1 to about 0.83:1 based upon moles of polyamine to moles of polyepoxide.

23. The container of claim 22 wherein the polyamine is an aliphatic polyamine selected from the group consisting of ethylenediamine, diethylenetriamine, triethylenetetramine and tetraethylenepentamine.

24. The container of claim 23 wherein the polyepoxide reacted with the polyamine to form the ungelled amine-functional polymeric resin is a diglycidyl ether of either an aromatic diol or an aliphatic diol.

25. The container of claim 24 wherein the polyepoxide reacted with the ungelled amine-functional polymeric resin to form the thermoset barrier material is a polyglycidyl ether of either an aromatic polyol or an aliphatic polyol.

26. The container of claim 16 wherein the barrier layer further includes a pigment capable of lowering the gas permeability of said barrier layer.

* * * * *